Oct. 23, 1928.  
E. AUFIERO  
ELECTRIC MOTOR  
Filed Jan. 11, 1924  
1,688,847
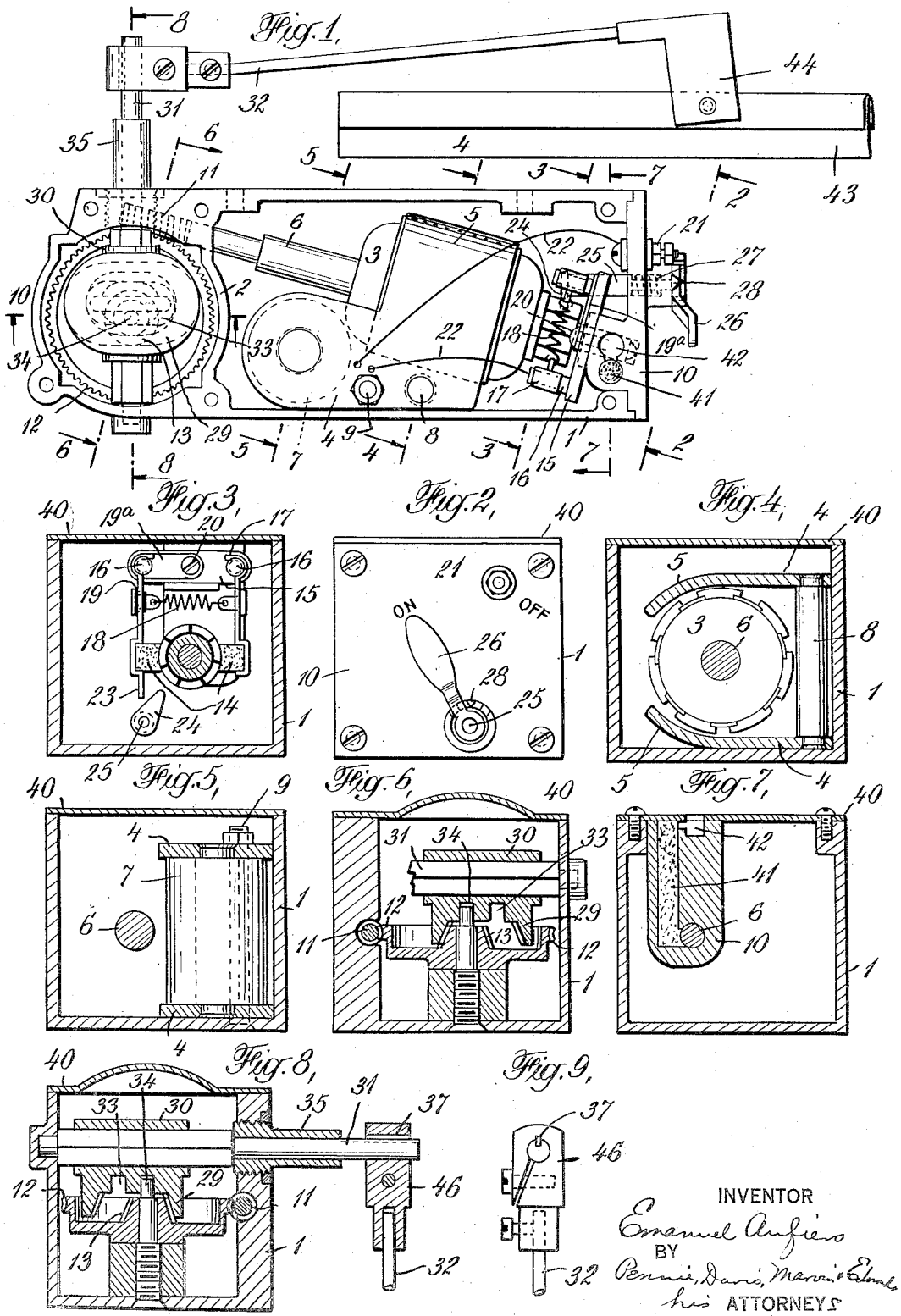

Patented Oct. 23, 1928.

1,688,847

UNITED STATES PATENT OFFICE.

EMANUEL AUFIERO, OF BROOKLYN, NEW YORK, ASSIGNOR TO E. A. LABORATORIES, INC., OF BROOKLYN, NEW YORK.

ELECTRIC MOTOR.

Application filed January 11, 1924. Serial No. 685,633.

This invention relates to an improved electric motor capable of use in numerous different associations, but particularly intended to be employed in connection with windshield cleaners and similar mechanisms.

It is an object of the invention to provide a motor the parts of which will be relatively few in number and individually simple and rugged in construction, such parts being readity assembled to provide a motor operating over long periods of time with freedom from electrical and mechanical difficulties; and in which current consumption will be negligible, aside from the fact that the motor may be placed upon the market at a relatively nominal figure.

A further object of the invention is that of providing a motor which will occupy a minimum amount of space and which will include simple and improved mechanism whereby its operation may be controlled.

With these and further objects in mind the invention accordingly comprises the features of construction, combination of elements and arrangement of parts which will be exemplified in the construction hereinafter set forth, and the scope of the application of which will be indicated in the claims.

For a fuller understanding of the nature and objects of the invention reference should be had to the following detailed description taken in connection with the accompanying drawings, in which:

Fig. 1 is a plan view of the windshield cleaner showing the operating parts assembled in the casing and with the cover of the casing removed.

Fig. 2 is an end elevation looking from the position indicated by line 2—2 of Fig. 1;

Figs. 3, 4, 5, 6, 7 and 8, respectively, are transverse sectional views on the section lines shown in Fig. 1 and looking in the direction of the indicating arrows;

Fig. 9 is a detail view of the clamp for attaching the wiper arm to its operating shaft.

Referring to the drawings, 1 indicates the casing of the mechanism here shown as a die casting divided into two compartments by a transverse web 2, thereby forming separate motor and gear compartments. The electric motor 3 comprises a field frame consisting of two pole pieces 4 which are preferably stamped out of sheet metal and are of the unique L shape shown in Fig. 1. That is, each piece comprises a part 5 partially encircling the armature of the motor as shown more particularly in Fig. 4, and an extension at an angle to said member somewhat greater than at right angles, to thereby facilitate the mounting of the motor shaft 6 in the casing at an angle to its longitudinal axis.

The field coil 7 is mounted between the ends of the extensions as shown in Fig. 5, the extensions being also connected by a spacing rod 8. The ends of the core of the field magnet and also the spacing bar are riveted as shown, to produce a rigid, unitary field frame.

The field frame is held in place by a bolt 9 by means of which the frame is clamped in fixed position to the bottom wall of the casing.

The armature shaft is supported in bearings at each end, one bearing being formed in the end wall 10 of the casing which is formed in a separate piece from the rest of the casing, while the other bearing is formed in the transverse web 2 which separates the motor compartment from the gear compartment. The end of the motor shaft projects through its bearing in the web 2 and its projecting end is formed with a driving worm 11 meshing with a ring gear 12 formed integrally with the driving pinion 13 of the reversing gear mechanism which I will later describe.

The commutator of the electric motor is mounted at the end of the armature adjacent the end wall 10 of the casing in position to be engaged by the brushes 14 which are of novel construction and form one of the features of my invention. The brush mechanism is best shown in Figs. 1–3, and consists essentially of a supporting bar 15 of fibre or other insulating material attached to the end wall of the frame above the armature shaft from which the two brush arms depend in position for the brushes to engage the opposite sides of the commutator. The connections between the brush arms and the supporting bar 15 comprise pins 16 set in the ends of the bar 15 and hooks 17 formed on the ends of the brush arms and which are adapted to partially encircle the pins. A spring 18 extends between the brush arms and draws them toward each other to thereby hold the hooks in engagement with the pins and also hold the brushes in proper contact with the commutator. The spring 18 is insulated from one of the arms by a washer 19. Also one of the pins 16 is grounded by means of a strip of metal 19ª extending from the pin to the screw 20 by which the supporting bar is attached to the casing, thereby forming a complete circuit for the operating current from the binding post 21 also carried by the end wall 10, thence to the field coil through a connecting wire 22 as shown in Fig. 1, thence from the field coil to the insulated brush through the armature to the grounded brush and to the grounded side of the battery.

The brush construction above described not only provides a very simple, economical and easily assembled brush mechanism, but also provides a switch mechanism whereby the motor may be started and stopped.

To this end the grounded brush 16 is provided with an extension 23 adapted to be engaged by an arm 24 supported on the inner end of the shaft 25 of the switch lever 26. The shaft 25 is supported in a bearing drilled through the end plate 10 and countersunk on its inner side to receive a light spring 27 by means of which the switch arm 26 is held in engagement with the adjacent wall of the projection on the wall 10 through which the bearing passes. The bearing is also countersunk at its outer end to receive the hub of the lever arm and the wall of the countersink is cut away for the passage of the arm to thereby limit the movement of the arm from the on to off position, as shown in Fig. 2. A projection or point 28 is left in the cut-away portion of the wall as shown in Fig. 1, whereby the spring 27 holds the switch lever in one or the other of its two positions.

As the operating arm 24 of the switch engages only the grounded brush holder, it is not necessary to insulate any part of the switch mechanism. The same switch mechanism can, however, be used on a non-grounded circuit by insulating the arm 24 from its shaft.

The motor shaft 6, as stated above, extends through the partition 2 at an angle to the axis of the casing. By this arrangement the driving worm 11 lies adjacent the front wall of the casing as shown in Fig. 1, thereby allowing the use of a worm wheel of a diameter substantially equal to that of the gear compartment. By this arrangement both the driven gear and the motor armature may be nearly as large as the casing itself and at the same time permit a direct driving connection between the armature shaft and the gear.

The reversing pinion 13 is preferably a beveled pinion formed on the hub of the worm wheel and this pinion engages a beveled elliptical internal gear or rack 29. The gear 29 extends partially around the circumference of a sleeve 30 which is mounted for sliding movement on a hexagonal portion of the oscillating shaft 31 which supports the wiper arm 32.

The elliptical gear 29 is also formed with a cam groove 33 conforming to the shape of the elliptical gear, which cam groove receives a pin 34 formed on the projecting end of the stud which serves as a spindle for the driving pinion 13, thereby maintaining the pinion and internal elliptical gear always in mesh.

The shaft 31 is supported at its outer end in the wall of the casing and at its inner end is provided with an elongated bearing 35 adapted when the cleaner is attached to the windshield to project through the hole in the windshield frame through which the shaft 31 is projected in order to operate the wiper on the outside of the windshield from the motor attached to the inner side of the frame.

The hub 30 of the elliptical gear which slides on the hexagonal part of the shaft 31 does not itself have an exactly hexagonal bore. Instead, each corner of the bore is cut away. By thus cutting away the corners of the sleeve the frictional engagement between the hub of the pinion and its shaft is reduced nearly 50% without interfering in any way with the ample driving engagement between the shaft and the pinion afforded by the six flat faces of the shaft.

The cover plate 40 for the casing fits tightly over both the gear compartment and the motor compartment and when the device is assembled the gear compartment is filled with oil or grease to thereby provide lubrication for the gearing and the adjacent end of the motor shaft for an indefinite period. The other end of the motor shaft is lubricated by means of a wick 41 supported in the end plate 10 in position for its lower end to wipe the side of the shaft. The wick will be saturated with oil when the device is assembled and need receive no further attention for a long period of operation. A small oil pocket 42 is, however, provided, to permit subsequent lubrication of the wick.

The wiper consists of the usual rubber strip 43 held in a sheet metal clamp or back which is loosely pivoted to the bracket 44 at the free end of the wiper arm 32. The wiper arm is connected to the shaft by means of a split clamping hub 46 (see Figs. 8 and 9) and also by a key 37, the latter being provided to prevent attachment of the arm to the shaft in the wrong position. I have found that by this construction I am able to adjust the wiper toward and from the windshield to insure sufficient pressure to keep the windshield clear. While the key alone would furnish a driving connection, unless the shaft and key are larger than otherwise necessary, the key will be rapidly worn out. By using the key merely to maintain the proper position of the arm of the shaft and the clamp to furnish the driving engagement, this difficulty is avoided.

In order to maintain the necessary driving power with a motor of small dimensions it is of course essential that the motor operate at fairly high speed, but as the speed of oscillation of the wiper arm must be kept within reasonable limits, a high speed motor requires a large gear reduction between the motor shaft and the shaft of the wiper arm, and a gear of large diameter also adds to the size of the casing so that reducing the size of the motor beyond such limits does not permit a corresponding reduction in the dimensions of the housing. By the oblique motor construction disclosed in this application, both the motor and gear may occupy substantially the full dimensions of the casing, whereas with a motor of the ordinary construction with its field coils lying circumferentially of the armature and with its driving shaft extending parallel with the axis of the casing, a much wider casing is required for the same motor unless the diameter of the worm gear is reduced to less than half the diameter of the armature. With a driving gear of such size a double gear reduction would be necessary to sufficiently reduce the speed of the wiper arm to within the necessary limits. A double reduction gear not only adds to the cost of the device, but also greatly reduces the efficiency and increases the noise to such a point that the windshield cleaners so made have been practically unsalable.

With my improved construction the motor may be large enough not to require excessive speed to furnish the necessary driving power, and a reducing gear large enough to give a substantially noiseless operation of the reversing gear and wiper arm may be employed.

I claim:

1. In an electric motor, the combination of an armature, a field coil having its axis extending at right angles to the axis of rotation of said armature, said coil being offset longitudinally with respect to said armature, and a field frame comprising substantially L-shaped pieces with one portion of each engaging the ends of said field coil and with the other portions partially surrounding the said armature.

2. The herein described operating-means for windshield-cleaners, consisting of an electric motor which comprises, in combination, an oblong and substantially rectangular casing, a shaft located diagonally within said casing and journalled at the ends of the casing, an armature secured to said shaft and revoluble therewith, and also located within said casing a single cylindrical field-coil only whose length approximates the width of the casing, said coil being secured to a side-wall of said casing with its axis at right angles to said shaft and longitudinally offset with respect to said shaft and armature, the portion of said coil which is nearest said shaft being separated therefrom by a less distance than the radius of said armature.

3. The herein-described operating-means for windshield-cleaners, consisting of an electric motor which comprises, in combination, an oblong and substantially rectangular casing, a shaft located diagonally within said casing and journalled at the ends of the casing, an armature secured to said shaft and revoluble therewith, and also located within the casing a single cylindrical field-coil only, said coil being secured to a side-wall of said casing with its axis at right angles to said shaft and longitudinally offset with respect to said shaft and armature, the portion of said coil which is nearest said shaft being separated therefrom by a less distance than the radius of said armature, and opposite iron members serving as pole-pieces for the ends of said coil and having extensions curved respectively about opposite sides of said armature.

In testimony whereof I affix my signature.

EMANUEL AUFIERO.